Nov. 3, 1964  S. P. FELIX ETAL  3,155,613
FILTERING APPARATUS
Filed June 29, 1960  4 Sheets-Sheet 1

INVENTORS
SAMUEL P. FELIX &
JOHN R. SCHNEIDER
BY
Busser, Smith & Harding
ATTORNEYS INVENTORS
SAMUEL P. FELIX &
JOHN R. SCHNEIDER
BY
Busser, Smith + Harding
ATTORNEYS Nov. 3, 1964  S. P. FELIX ETAL  3,155,613
FILTERING APPARATUS
Filed June 29, 1960  4 Sheets-Sheet 4
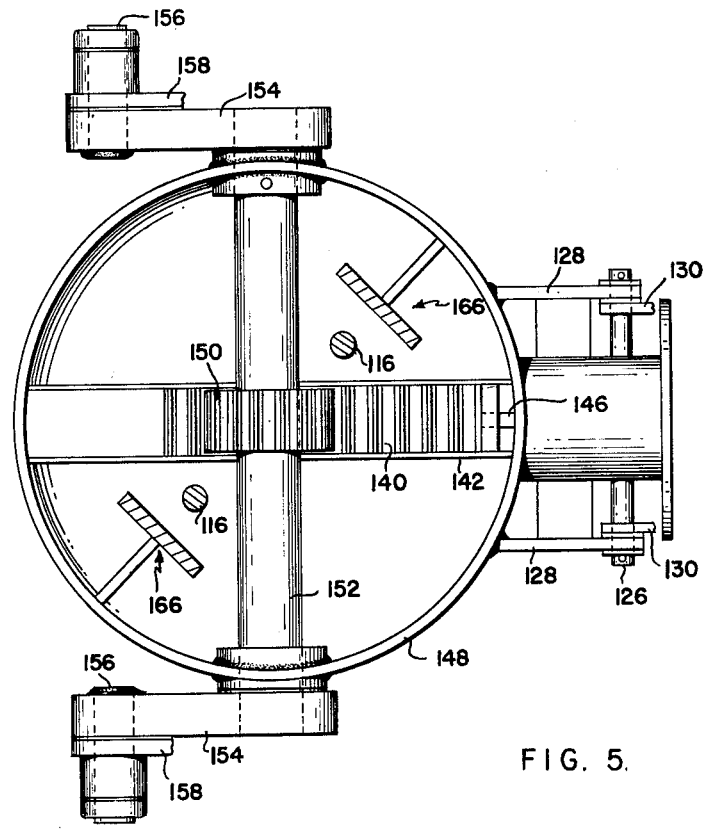
FIG. 5.
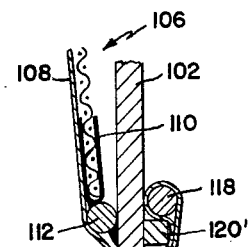
FIG. 6.
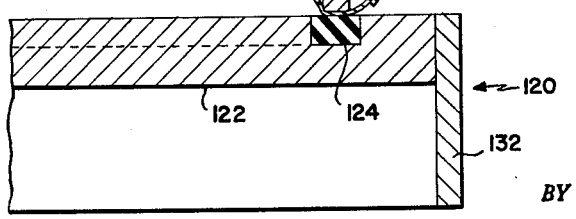
INVENTORS
SAMUEL P. FELIX &
JOHN R. SCHNEIDER
BY
ATTORNEYS United States Patent Office 3,155,613
Patented Nov. 3, 1964

3,155,613
FILTERING APPARATUS
Samuel P. Felix, Palo Alto, and John R. Schneider, Belvedere, Calif., assignors, by mesne assignments, to De Laval Turbine Inc., Trenton, N.J., a corporation of Delaware
Filed June 29, 1960, Ser. No. 39,622
3 Claims. (Cl. 210—232)

This invention relates to a filtering apparatus which is particularly adapted to the recovery of very fine solid materials suspended in liquids.

The removal by filtration of very fine suspended solid particles from liquids poses certain problems particularly when it is desirable to remove accumulated filter cake by backwashing. The filter cake in such a process must ordinarily involve the use of filter aid to aid in building up a filtering surface. In the past the backwashing was directed into the same tank from which the suspension reaches the filters. When the cake is removed by backwashing, a very large proportion of the fine solid material will remain in suspension in the backwash liquid with the result that it is not removable except by further filtration. The precoat becomes contaminated with the suspended fines which reduces its filtering efficiency and results in short runs and eventual clogging of the screens. The resulting operation is, accordingly, uneconomical and unsatisfactory.

In many filtering operations, as for example in aluminum rolling mills using expensive lubricating and cooling oil, it is desirable to recover the oil used in backwashing so that this oil may be reused. Hence, it is necessary to have an efficient high solids filter for filtering the backwash which contains a high percentage of solids in the form of filter cake. The filter cake comprises the filter aid which may be diatomaceous earth and fuller's earth and the filtered solids built up in the preceding filtering operation. It would also be desirable to use as little oil as possible in the backwashing operation so that the recovery time may be minimized and as little of the expensive oil is used as possible.

In some cases, the recovery of the originally suspended fine particles is of even more consequence than the recovery of clean liquid. An example in point arises in the aluminum processing industry. The raw material for aluminum is alumina. This is dissolved in cryolite and aluminum is produced by electrolysis. The evolved gases are scrubbed with water and the result is the production of an aqueous suspension of alumina in very fine divided form. The concentration of alumina in this scrubbing water at the point when it is necessary to remove it from the scrubbing action is relatively low, but in view of the large amounts of scrubbing water used in aluminum plants the loss of alumina by discard of the scrubbing water would be very great. It is desirable, therefore, to recover the suspended alumina. However, by reason of the nature of the suspension, filtration is very difficult. The use of ordinary filter aids such as diatomaceous earth does not solve the recovery problem since alumina must ultimately be recovered in quite pure form in order to be used. Thus, ground aluminum oxide is used as the filter aid, so that what is recovered is directly returnable to the process. It will be understood that this recovery of alumina is illustrative of the recovery of materials originally in very fine suspension through the use, as filter aids, of powdered materials of the same chemical composition. Thus, the high solids filter should provide for recovery of the solids filtered from the liquid.

A filter system of the indicated type is also useable with a public water supply system in which no bacteria-containing solids should pass to the filtered water reservoir. In this case, filter aid is also used and the filtered solids are discarded whereby the above-discussed problems are presented. In this case, a plurality of filters may be placed in parallel to insure effective filtering.

An effective high solids filter is also useable in public water supply filtering systems wherein the disposal of the backwashing liquid would result in contamination at the place of disposal and thereby cause a public nuisance. In order to avoid the contamination, the backwash can be passed through a high solids filter in accordance with this invention. The separated solids are then removed from the filter and may be carried away to a suitable dumping place and the backwash liquid may be disposed of without any resulting contamination at the place of disposal.

Another application of the high solids filter is the filtering of oils, such as cottonseed oil and vegetable oil. In this case a filter aid may or may not be used. However, the filtering here involves a high solids content and a low flow rate so that the high solids filter in accordance with this invention is particularly advantageous.

It is an object of this invention to recover the liquid used in backwashing and to render this liquid suitable for reuse or disposal.

Another object of this invention is to provide a filtering apparatus for recovering very fine solid materials.

A further object of this invention is to provide an apparatus for filtering liquids having a high solids content such as the sludge formed in a filtering operation of the indicated type.

The above and other objects of the present invention will become apparent from a consideration of the following description, read in conjunction with the accompanying drawings, in which:

FIGURE 5 is a view taken on a plane indicated at line 5—5 of FIGURE 4;

FIGURE 6 is an enlarged view of a detail of the filter shown in FIGURE 4; and

FIGURE 7 shows diagrammatically the manner in which the filter storage tank is used in the filtering system.

Figure 1:
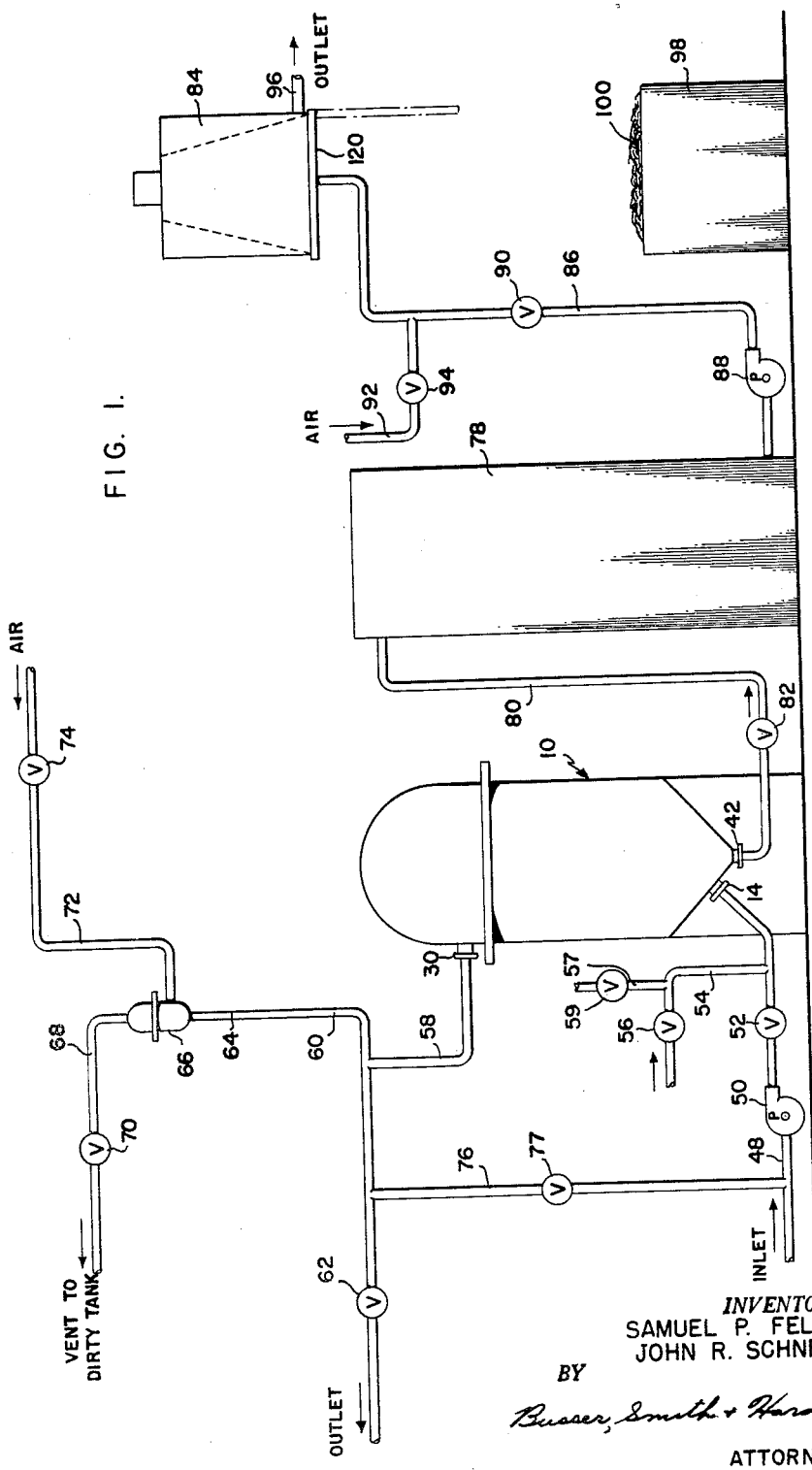
FIGURE 1 shows diagrammatically a filtering system provided in accordance with the invention.
Figures 2, 3:
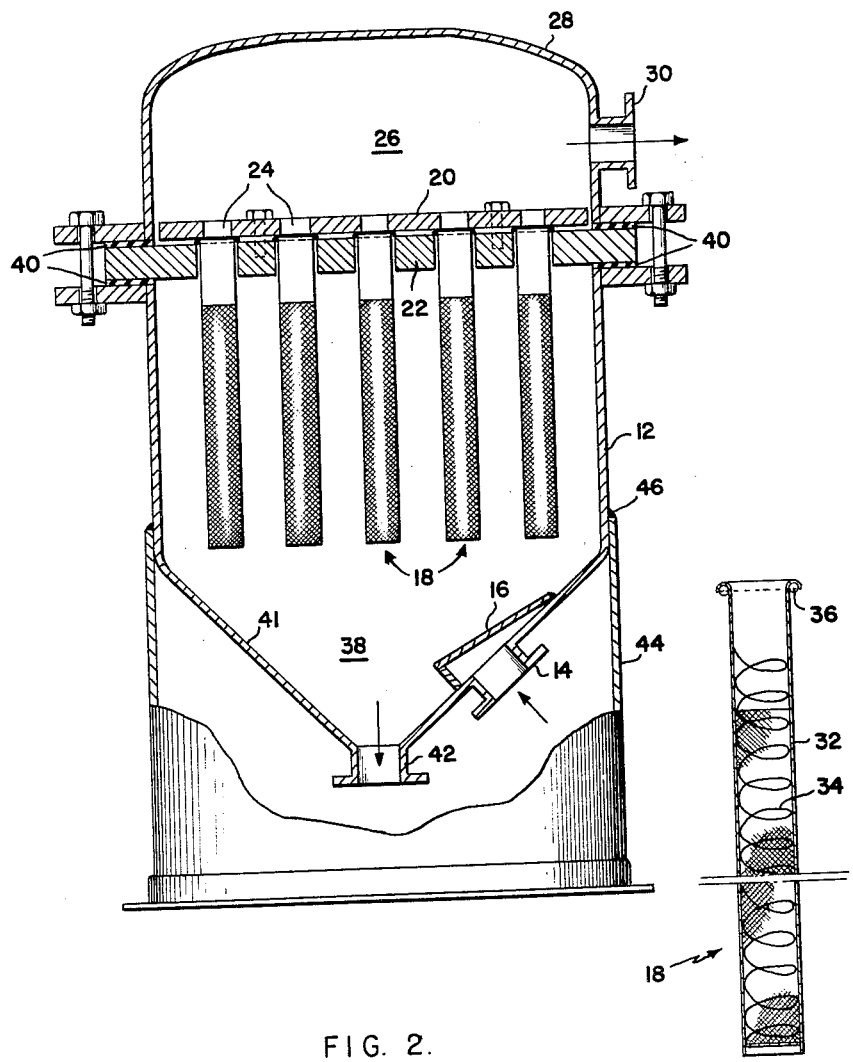
FIGURE 2 is a sectional view, in elevation, of a filter in accordance with this invention.
FIGURE 3 is a detailed view of one of the filter elements used in the structure shown in FIGURE 2.

In FIGURES 1 and 2 the filter proper is indicated generally at 10 and comprises a tank 12 which receives the suspension to be filtered through an inlet connection 14 controlled by an open-ended baffle 16. Tank 12 contains a plurality of tubular filter elements 18 which are positioned throughout the tank cross-section. The liquid entering tank 12 through inlet 14 passes out of the open ends of baffle 16 which serves to minimize the turbulence in tank 12 so that the accumulated filter cake on elements 18 will not be disturbed and break off. Filter elements 18 are supported at their upper ends between a pair of supporting plates 20 and 22. The upper plate 20 has a plurality of openings 24 communicating with the interior of the filter elements 18 and with an outlet chamber 26 formed in the upper section 28 of tank 12. Outlet chamber 26 has an outlet connection 30 through which the filtrate leaves tank 12 after passing through the filter elements 18 and outlet chamber 26.

As is best shown in FIGURE 3, each filter element 18 comprises a mesh tube 32 closed at the lower end and open at the upper end thereof. A spiral spring 34 is contained within the tube 32 and tends to uncoil so as to maintain the shape of the tube 34 and prevent radial collapse thereof under external pressure, there existing, particularly in some uses of the filter, a high pressure gradient across the tube walls. The upper end of tube 32 is bent over an O-ring 36. The ring 36 and the bent over portion of tube 34 are clamped between the plates 20 and 22 to retain the filter elements 18 in their filtering position.

The rings 36 serve to seal the inlet chamber 38 from the outlet chamber 26. Suitable seals are provided at 40 to seal the tank 12 at the junction with the upper section 28. The tank 12 has a conical lower portion 41 terminating in an outlet connection 42 which permits draining of the inlet chamber 38. Tank 12 is supported on a cylindrical section 44 welded to the tank 12 at 46.

The liquid to be filtered is delivered from a storage tank to be hereinafter described to inlet 14 of filter 10 through a line 48 containing a delivery pump 50 and a control valve 52. The precoat liquid is delivered to inlet 14 of filter 10 through a line 54 containing a control valve 56 and communicating with line 48 downstream of valve 52. The precoat liquid contains a filter aid which may comprise diatomaceous earth or powdered material of the same chemical composition as the solids to be filtered.

The precoating operation involves the feeding of a large amount of filter aid into the filter in a short time to form a precoat of about 1/16 of an inch on the filter elements. The filter aid bridges the openings in the filter elements 18 and builds up a precoating of filter cake. Also involved is body feeding wherein a small amount of filter aid is added through a line 57 and a valve 59 to the liquid to be filtered as it passes to the inlet of filter 10. The body feed serves to form an additional layer to prevent the filtered solids from building up an impervious layer which would quickly build up the pressure and terminate the run. The body feed accomplishes its purpose simply by mixing with the solids to be filtered, while they are still suspended in the liquid, in sufficient quantities so that when the resulting mixture of these solids is deposited on the filter cake, it will be sufficiently porous to build up the desired thickness of cake without producing an excessive pressure drop or excessively restricting the flow of the liquid. The body feed filter aid may comprise diatomaceous earth solely or it may comprise a mixture of diatomaceous earth and fuller's earth. When the mixture is used, the diatomaceous earth serves to mechanically filter out the solids in the aforementioned manner. The fuller's earth which is comprised of an adsorbent clay, serves to remove various solids from solution. The precoat and body feed liquids are stored in separate tanks.

The precoating and body feed operations form no part of this invention per se and for a more complete description thereof reference is made to the application of Samuel P. Felix and John R. Schneider, Serial No. 770,188, filed October 28, 1958, and now abandoned, and the application of John R. Schneider, Serial No. 9,876, filed February 19, 1960.

The outlet connection 30 of filter 10 is connected through lines 58 and 60, which latter contains a control valve 62, to the filtrate reservoir (not shown). Line 58 is also connected to a line 64 which is connected to the lower portion of an automatic vent valve 66 of the float type which closes after the liquid therein reaches a certain level and permits the escape of air when the liquid is below the shut-off level. A line 68, containing a control valve 70, is connected between the upper portion of vent valve 66 to the storage tank for receiving dirty liquid. An air supply line 72 containing a valve 74 is connected between the lower portion of vent valve 66 and an air supply (not shown). A recirculating line 76 containing a control valve 77 is connected between the lines 60 and 48.

The drain outlet 42 is connected to a drain tank 78 by a line 80 containing a control valve 82. The drain tank is vented at its upper end to permit the escape of air therefrom. The lower end of drain tank 78 is connected to a recovery or high solids filter 84 by means of a line 86 containing a delivery pump 88 and a control valve 90. Air may be supplied to filter 84 by a line 92, which contains a control valve 94. Line 92 is connected at its upstream end to an air supply (not shown) and at its downstream end to line 86 downstream of valve 90. A line 96 is provided for delivering the liquid from the outlet of filter 84 to a storage tank. A tote box 98 is positioned beneath the filter 84 for accumulating the sludge 100 collected therein.

Figure 4:
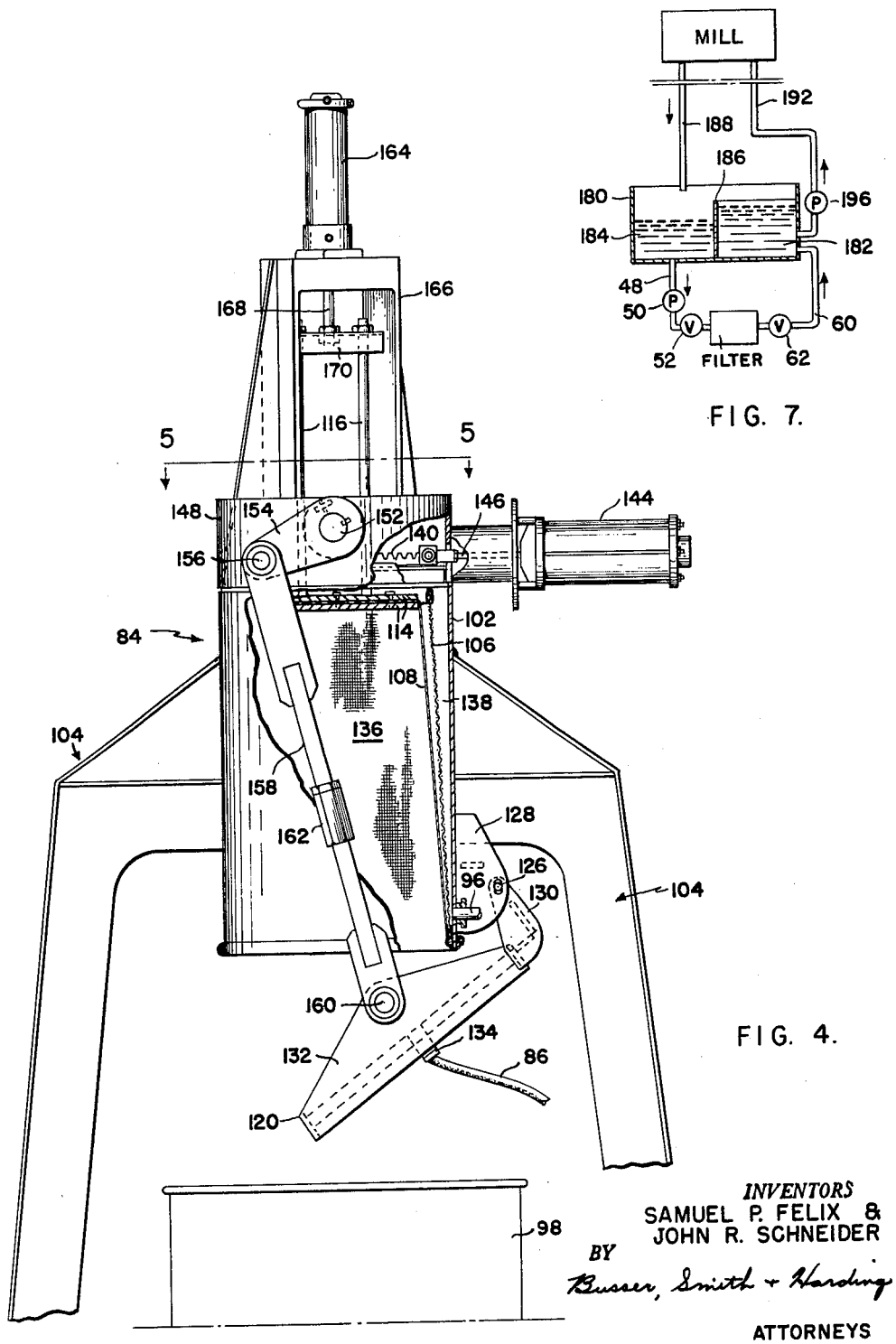
FIGURE 4 is an elevational view partly in section showing a high solids filter in accordance with this invention.

The filter 84 is best shown in FIGURES 4, 5 and 6 and comprises a cylindrical tank 102 supported above the tote box 98 by supporting arms 104. The filtering element is contained within tank 102 and comprises a filter bag 108 having a conical backing screen 106 on the downstream or outer side thereof to restrict outward movement of the bag 108.

As shown in FIGURE 6, the lower end of backing screen 106 is contained within an annular clamping band 110 supported on a ring 112 which is welded to the inner wall of tank 102. Band 110 is welded at its lower end to the ring 112. Backing screen 106 may comprise an outer shell of No. 4 mesh wire cloth and an inner shell of No. 10 mesh wire cloth. The upper end of backing screen 106 is also contained within a clamping band 110 which is welded to the upper end of tank 102.

The recovery or filter bag 108 is made of a suitable filtering duck and is positioned within backing screen 106. Bag 108 is clamped, at its upper end, between a pair of plates 114 bolted together and supported by a pair of actuating rods 116 welded to the upper plate 114. The actuating rods 116 serve to shake the bag 108 in a manner to be hereinafter described. The lower end of bag 108 is wrapped around a shock cord 118 and secured to an adjacent portion of the bag as shown in FIGURE 6. The cord 118 is made of an elastic plastic material and may be stretched over a projecting rim 120' on the exterior of tank 102 at the bottom end thereof to thereby retain the bottom end of the bag 108. The bag 108 thus passes over the lower end portion of the tank 102.

A swinging filter door 120 is provided for opening and closing the bottom of the tank 102. Door 120 is circular in shape and has a portion 122 adapted to engage the lower end of the tank 102 at a resilient gasket 124 recessed within portion 122 as is shown in FIGURE 6. The contact between gasket 124 and the bottom of the tank 102 seals the tank 102 when the door 120 is in the closed position thereof.

The pivotal support for the door 120 comprises a pivot rod 126 carried by a pair of supports 128 welded to the side of the tank 102. A pair of arms 130 are pivotally supported at one end on the pivot rod 126 and are welded at the other end to a substantially cylindrical portion 132 of door 120. The door 120 may thus pivot about pivot rod 126 between an open position shown in dotted lines in the FIGURE 1 and a closed position shown in FIGURE 6 and in full lines in FIGURE 1.

The line 86 passing from the drain tank 78 is fitted in an inlet fitting 134 carried by portion 122 of door 120. Line 86 is flexible to permit pivotal movement of door 120. The liquid in the drain tank may thus be pumped from the drain tank 78 through the line 86 and door 120 into an inlet chamber 136 within the recovery filter 84 when the door is in the closed position. The filtrate thus passes through the bag 108 and the backing screen 106 into an outlet chamber 138 and out of the tank 102 by way of line 96 which is connected to a fitting in the side of tank 102.

Means are provided for actuating the door 120 between the open and closed positions thereof. Such means comprises an elongated rack 140 mounted for reciprocal movement in an elongated track member 142 supported on the top of tank 102. Rack 140 is operatively connected to the actuating rod of a suitable air cylinder means 144. Air cylinder means 144 is supported on a cylindrical member 148 mounted on the top of tank 102 and may be of any suitable type well known in the art having the required stroke for reciprocating the actuating rod 146 and rack 140 the desired amount. The teeth of the rack 140 engage the teeth of a gear 150 keyed to a shaft 152 journalled in cylindrical portion 148. The outermost ends of shaft 150 have crank arms 154 keyed thereto for rotation with the shaft 150. Crank arms 154 carry pins 156 which pivotally support connecting rods 158 pivotally connected at their lower end to pins 160 carried by cylindrical portion 132 of door 120. Rods 158 are adjustable in length by means of a rotatable nut 162 as is well known.

In operation, when it is desired to close door 120, the air cylinder 144 is supplied with air to move the actuating rod 146 and rack 140 to the left as viewed in FIGURES 4 and 5. This causes clockwise rotation or gear 150, shaft 152 and crank arms 154 whereby the connecting rods 158 are raised to lift the door 120. The door 120 thus pivots in a clockwise direction about the pivot rod 126 to engage the lower end of tank 102. When it is desired to open the door 120, the air cylinder 144 is supplied with air to move the actuating rod 146 and rack 140 to the right. This causes counterclockwise rotation of crank arms 154, downward movement of connecting rods 158 and counterclockwise rotation of door 120 about pivot rod 126 to open the door 120.

Means are provided for shaking the bag 108 after the sludge has been collected on the inner wall thereof as will be hereinafter described. The sludge may comprise diatomaceous earth, fuller's earth and filtered solids and will be in a substantially dry condition in accordance with the procedure involved in this invention. The shaking of the bag 108 thus serves to loosen the sludge from adherence thereto whereby the sludge will fall through the bottom of tank 102 into the tote box 98 when the door 120 is open.

The bag actuating means comprises an air cylinder 164 which is similar to the air cylinder 144 but may have a shorter stroke. The air cylinder 164 is supported in a vertical position above tank 102 by a frame generally indicated at 166. The air cylinder actuating rod 168 is bolted to a plate 170 which has the upper end of actuating rods 116 connected thereto. It will thus be apparent that as the actuating rod 168 is reciprocated vertically by actuation of the air cylinder 164, the rods 116 will shake the plate vertically whereby bag 108 will be shaken to loosen the sludge adhering thereto.

FIGURE 7 shows the manner in which the filtering system in accordance with this invention is connected for use with a mill or other apparatus where filtrate is to be reused. A storage tank 180 is provided for the oil used in the mill and comprises a "clean" section 182 and a "dirty" section 184 separated by a weir 186. The flow is indicated by the arrows in FIGURE 7. The oil used in the mill is returned to the dirty section 184 of the storage tank 180 through a line 188. The dirty section 184 is connected to the filter inlet by line 48, pump 50 and valve 52. Pump 50 delivers the liquid to be filtered from the dirty section through the filter 10, line 60 and valve 62 into the clean section 182. A delivery pump 196 is provided for pumping the liquid from the clean section 182 through a line 192 into the mill. Pump 196 is designed to deliver 100 percent of the oil required by the mill and pump 50 is designed to deliver 110 percent of this mill capacity. Thus, during the filtering operation there is a 10 percent flow of oil across the weir 186 from the clean section 182 to the dirty section 184. When the valves 52 and 62 are closed and the pump 50 is inoperative, as for example during a backwashing operation, the level of the dirty section will rise by reason of the steady inflow of oil from the mill through line 188. Eventually, the liquid in the dirty section will flow across weir 186 into the clean section. However, there will only be a small proportion of this dirty overflow liquid compared with the clean liquid within the clean section 182 whereby the liquid delivered by pump 196 to the mill will not adversely affect the operation thereof. It will be noted that the system shown in FIGURE 7 permits delivery 100 percent of mill capacity at all times. Also, the filter may be operating at 110 percent of the mill capacity by reason of the weir arrangement to thereby keep the clean section adequately supplied with clean filtrate.

The filtering operation sequence involves the steps of (1) pressurization, (2) blowdown and draining (backwashing), (3) precoating, (4) filling and recirculation, and (5) filtering.

The pressurization step takes place after a preceding filtering operation has been completed and the filter elements 18 have an excessive layer of filter cake formed thereon. The pressurization of filter 10 serves to provide a sudden high velocity surge when the drain valve 82 is subsequently opened to thereby remove all of the filter cake adhering to the filtering elements 10. The removed filter cake will thus be washed out the drain outlet 42. In the pressurization step, all of the control valves are closed with exception of the air inlet valve 74. Air is thus forced into the filter 10 through lines 72, 64 and 30 to pressurize the filter 10 to approximately 75 p.s.i.

In the blowdown and draining or backwashing step, only the air inlet valve 74 and the draining valve 82 are open. At the end of a preceding filtering operation, the valves 52 and 62 are closed thereby trapping the filtrate in outlet chamber 26 and fluid to be filtered in inlet chamber 38. Thus, when the drain valve 82 is open, there will be a sudden surge loosening the filter cake which is washed out by the trapped liquid in the filter 10. The filtrate in outlet chamber 26 surges through elements 18 to remove the filter cake therefrom. The air entering the discharge side of the filter 10 serves to force the contents of the filter 10 out through the drain connection 42 through the line 80 and control valve 82 into the drain tank 78. The air also serves to "blowdown" or loosen the filter cake on the filter elements 18. The filter cake thus becomes suspended in the liquid within the filter 10 and is carried thereby into the drain tank 78. This backwashing step thus serves to clean the filter 10 in preparation for a subsequent filtering operation.

It will be noted that this backwashing step only involves the liquid which remained in the filter 10 at the close of the previous filtering operation. In the backwashing operations heretofore used, additional backwashing liquid was pumped into the filter 10 through the discharge side thereof. By using a minimum of liquid in the backwashing operation, the time necessary to recover the backwash liquid for reuse is shortened. The backwashing step in accordance with this invention is effective to remove substantially all of the filter cake even though a minimum of liquid is used by reason of the sudden surging action previously described. This sudden surging action serves to quickly and effectively loosen the filter cake that has accumulated on the filter elements 18. Thus, it is possible to remove this filter cake from the filter 10 with a minimum of liquid.

In the prior filtering procedures where the filter cake is backwashed into the same tank from which a suspension is delivered to the filter 10, while a portion of the removed filter cake drops out as a sludge, a considerable portion of the fine solid material will remain in suspension in the backwashing liquid. When filtering is reestablished, the backwashing liquid will ordinarily be the first to be passed to the filter, and these fine particles will clog the precoat and cause short runs. This problem is avoided by the procedure in accordance with this invention.

In the precoating step all of the control valves are closed with the exception of the precoat inlet valve 56 and the valve 70. This step involves injecting a preset amount of diatomaceous earth, or other filter aid, into the filter 10. The filter aid is suspended in a clean or filtered liquid. The valve 70 is open to permit the escape of the pressurizing air from filter 10. The type of filter aid to be used and the details of this precoating step are more fully described in said prior-mentioned applications.

In the filling and recirculating step, the control valve 52 and the recirculating valve 77 are open in addition to the valve 70, the other valves being closed. The pump 50 is operated and serves to recirculate the precoat suspension until all of the precoat is deposited on the filter tubes 18. The recirculating path is from the downstream end of pump 50 through control valve 52 into the inlet chamber of filter 10, through the filter elements 18 into the outlet chamber 26, and through line 58, line 60, line 76, control valve 77 and line 48 to the upstream end of pump 50. During this recirculating step, the liquid to be filtered is drawn through line 48 and delivered into the system until the filter 10 is filled.

In the precoating step and in the initial stages of the filling and recirculating step, filter aid will pass through the filter elements 18 into outlet chamber 26 until a sufficient depth of precoat is formed thereon. The recirculating step serves to allow the filter aid to bridge the openings in the screen and to form a positive filtering cake. By recirculating the liquid through the recirculating path as described above, any contaminating solids will also be recirculated (this will be a minor amount because clean liquid is used for filling) and will eventually be filtered by the precoat that is built up on the filter elements 18. The recirculating is continued until all of the filter aid is on the precoat and only clean liquid passes into the outlet chamber 26. The filter 10 is now ready for the filtering step.

In the filtering step which follows, control valve 52, outlet valve 62 and body feed valve 57 are the only open valves in addition to the vent valve 70. Pump 50 thus delivers the liquid to be filtered from line 48 mixed with a proper amount of filter aid from lines 57 and 54 into the filter 10. After being filtered, the filtrate is passed through line 58, line 60 and control valve 62 to the "clean" section 182 of storage tank 180. The filtrate is now in a usable condition with substantially all the solid particles removed. The procedure in accordance with this invention involves a suitable body feed system as described in said prior-mentioned application, Serial No. 9,876, filed February 19, 1960, in which a proper amount of filter is fed continuously from a slurry tank into the filtering liquid. The body feed serves to extend the effective filtering time by preventing sealing over the filter cake by the turbidity some of which are slimy and non-porous.

The recovery or high solids filter operation involves the sequential steps of (1) recovering the liquid to be filtered, (2) drying the sludge, and (3) discharging the sludge. The recovery or high solids filter operations may take place immediately after a backwashing step such as the one in the above-described filtering sequence or a backwashing step involving the delivery of additional backwashing liquid to the discharge side of the filter 10. Filter 84 may also be used as the primary filtering apparatus in many high solids filtering applications.

In the step of recovering the liquid to be filtered, the control valves 82 and 94 are closed, control valve 90 is open and pump 88 is in operation. Pump 88 delivers the liquid to be filtered such as the liquid from the drain tank 78 through line 86 into the inlet chamber 136 of the recovery or high solids filter 84. The sludge is deposited on the inside of the filter cloth bag 108 in a cake which may be approximately six to eight inches deep. The backwash liquid passes through the bag 108 and the perforated backing screen 106 into the outlet chamber 138. From the outlet chamber 138 the clear liquid passes through the line 96 to a suitable storage tank for disposal or reuse.

After the drain tank is emptied, the step of drying the sludge deposited on the bag 108 begins. In this step, only the air inlet valve 94 is open. Air is supplied through the line 92, valve 94 and line 86 to purge the backwash liquid from the recovery filter 84. The sludge is thus dried by reason of the removal of the liquid therein by the purging action of the air.

In the sludge discharge step, all of the valves are closed. Then the air cylinder 144 is actuated to open the door 120 in the manner previously described to permit the dried sludge to drop onto the tote box 98. The air cylinder 164 is then actuated to shake the bag 108 in the manner previously described so that the dried sludge is removed therefrom and drops onto the tote box 98. The air cylinder need only be actuated through three to four to and fro movements before all of the filter cake is removed from the bag and falls. The whole sludge removal operation takes only two to three minutes and requires a minimum of manual labor. Thus, it provides a considerable time and labor saving over the high solids filters heretofore used wherein the filters had to be manually scraped after each filtering operation.

The procedure and apparatus in accordance with this invention provides a filtering system which is useable in the filtering of a public water supply system. The system in accordance with the invention avoids the problems of excessive turbidity by reason of the very effective filtering and sludge recovery operations. The invention also has application in many types of filtering as was previously described.

It will be apparent that changes may be made in the construction and arrangement of the parts and various modifications of details may be made without departing from the scope of the invention as defined by the following claims.

What is claimed is:

1. A sludge filter comprising a vertically extending tank defining a filter chamber therein and having an open bottom end, a door at the bottom of the tank, means pivotally mounting said door for movement between open and closed positions to open and close said tank bottom end, power actuated means connected to said door for actuating the same between said positions thereof, a bag filter mounted within said filtering chamber in an inverted position, said bag filter being closed at its upper end and open at its bottom end, the open bottom end of said bag filter being wrapped around the open end of said filter tank, resilient means on the exterior of said tank adjacent the open end thereof and secured to said wrapped around portion of said bag filter for retaining the bottom end of the bag filter on the exterior of said tank, a portion of said door being movable into and out of sealing contact with the wrapped around portion of said bag filter as said door opens and closes the tank bottom, movable means for supporting the closed upper end of said bag filter, power actuated means for actuating said movable means to shake said bag filter for loosening sludge adhering thereto, said bag filter dividing the filtering chamber into an inlet chamber internally of the bag filter and an outlet chamber externally of the bag filter, an inlet connection mounted in said door for delivering a liquid to be filtered into said inlet chamber within the bag filter whereby filtered solids adhere to the interior side of the bag filter, and means for discharging filtered liquid from said outlet chamber.

2. A sludge filter according to claim 1 wherein said door portion which contacts the wrapped around portion of said bag filter comprises a sealing gasket member which conforms to the shape of the open bottom of the tank.

3. A sludge filter according to claim 2 wherein said means for retaining the bottom end of the bag filter on the tank exterior includes an elastic ring extending around the periphery of the tank.

(References on following page)

References Cited in the file of this patent

UNITED STATES PATENTS

| | | |
|---|---|---|
| 1,771,928 | Jung | July 29, 1930 |
| 2,328,625 | Doran et al. | Sept. 7, 1943 |
| 2,423,172 | Booth | July 1, 1947 |
| 2,652,152 | Frankenhoff | Sept. 15, 1953 |
| 2,852,141 | Landon | Sept. 16, 1958 |
| 2,893,925 | Victor | July 7, 1959 |
| 2,901,115 | Schmidt et al. | Aug. 25, 1959 |
| 2,914,180 | Konopka et al. | Nov. 24, 1959 |
| 2,925,367 | Soelberg | Feb. 16, 1960 |
| 2,927,659 | Pabst et al. | Mar. 8, 1960 |
| 3,011,644 | Farrell et al. | Dec. 5, 1961 |